Oct. 20, 1936.  R. W. BROWN  2,058,211

CHRONOSCOPE

Filed Nov. 9, 1933

INVENTOR

Roy W. Brown

BY *Ely & Barrow*

ATTORNEYS

Patented Oct. 20, 1936

2,058,211

UNITED STATES PATENT OFFICE 2,058,211

CHRONOSCOPE

Roy W. Brown, Akron, Ohio, assignor to The Firestone Tire & Rubber Company, Akron, Ohio, a corporation of Ohio Application November 9, 1933, Serial No. 697,276

8 Claims. (Cl. 161—15)

This invention relates to chronoscopes such as are used to measure minute intervals of time as, for example, in psychophysical experiments, and more especially it relates to electrically operated chronoscopes.

Instruments of the character mentioned have a wide range of utility in determining "reaction time" and "position change time". The instrument embodying the present invention is arranged especially for determining the fitness of persons for driving motor vehicles, it being equipped with pedals in simulation of the accelerator and brake pedals of an automobile, and it determines selectively the time required to release the accelerator pedal after a signal is given, or the time required thereafter to depress the brake pedal, or the total interval required for the two operations.

The chief objects of the invention are to provide for greater precision in the measurement of time; to provide a chronoscope of simplified construction; and to provide an electrically operated chronoscope that is self-contained. Other objects will be manifest.

Figure 1:
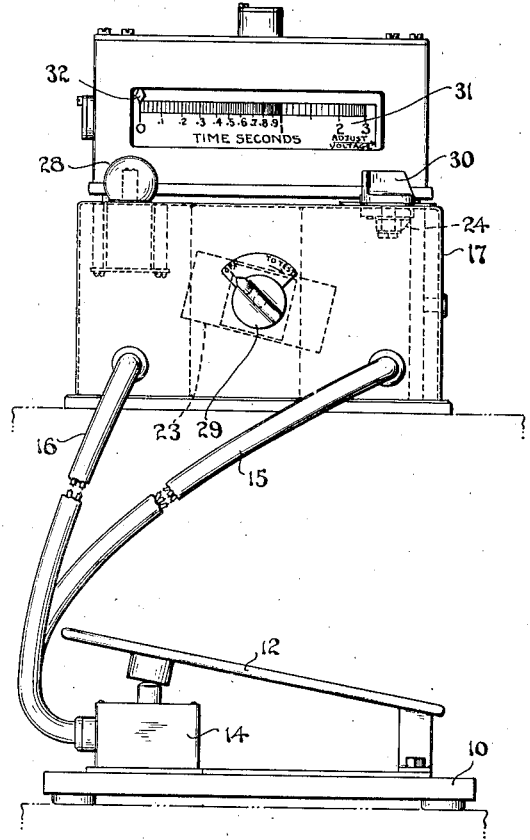
Figure 1 is a front elevation of a chronoscope embodying the invention in its preferred form.
Figure 2:
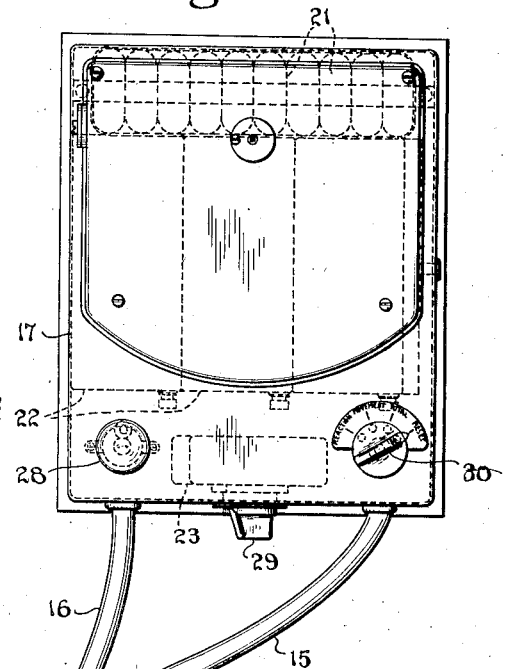
Figure 2 is a plan view thereof.

Briefly stated, the invention consists of apparatus for charging an electrical condenser during an interval of time in which a psychophysical manifestation is taking place, and then discharging the condenser through a galvanometer at the conclusion of the manifestation, the deflection of the galvanometer being a function of the time interval of the manifestation. The chronometer is calibrated so that the time interval is visibly indicated thereon in small fractions of a second.

In the illustrative embodiment of the invention shown in the accompanying drawing, the chronoscope is shown in an arrangement for testing the fitness of automobile drivers as evidenced by ability to react quickly to a warning signal suddenly presented, requiring release of the accelerator pedal, and thereafter depressing of the brake pedal. To this end there is provided a pedal block 10 upon which are pivotally mounted a pedal 11 representative of the accelerator pedal of an automobile, and a pedal 12 representative of a brake pedal. Beneath the free end of pedal 11 is a two-way push button switch 13, one side of which is normally closed, which side is opened and the other side closed when the pedal is depressed. In like manner a one-way normally closed switch 14 is positioned beneath the free end of pedal 12 so as to be opened when the pedal is depressed.

The pedal block 10 usually is positioned on the floor for convenient manipulation, and the switches 13, 14 thereof are connected by respective electrical conductor cables 15, 16 to a cabinet 17 in which the other electrical instruments of the chronoscope are mounted. The cabinet 17 may be positioned sufficiently close to the pedal block 10 to be operated by the person taking the test.

Mounted interiorly of the cabinet 17 are a galvanometer 20, a condenser 21 of 20 mfd. capacity, a 135-volt battery 22, an 8-second time relay switch 23, a 4-contact selector switch 24, and three resistance coils 25, 26 and 27 of which coils 25, 26 are of 50,000 ohms resistance and coil 27 is of 1 megohm resistance. The above values may be varied to produce different characteristics as may be required. Mounted upon the cabinet, exteriorly thereof, is a 110 v. 1 w. neon lamp 28 which will light substantially instantaneously, and knobs 29, 30 for switches 23 and 24 respectively. The galvanometer is provided with a calibrated dial 31 that is visible from the front of the cabinet and across which the arm or indicator 32 of the galvanometer moves. The dial 31 translates the movement of the indicator 32 into time in hundredths of a second. The galvanometer is preferably of the ballistic type and is provided with a magnetic shunt 20a and a resistor 20b for damping control. The magnetic shunt 20a is adjustable to compensate for changes in the battery voltage from the original voltage of the battery at the time of calibration of the galvanometer dial. A test position marked "adjust voltage" as illustrated on the drawing, may be placed on the dial 31 to give the proper position of indicator 32 when full battery voltage is placed on the galvanometer 20 and condenser 21 when the instrument is calibrated. If the battery voltage subsequently is increased or decreased, this change can be compensated for by adjusting magnetic shunt 20a so that the corresponding increased or decreased charge in condenser 21 will produce the same amount of deflection of the galvanometer indicator as when the instrument was first calibrated. The relay switch 23 is a well-known article of commerce constructed according to United States Letters Patent No.

1,884,571 to Everett Chapman, issued October 25, 1932.

Figure 3:
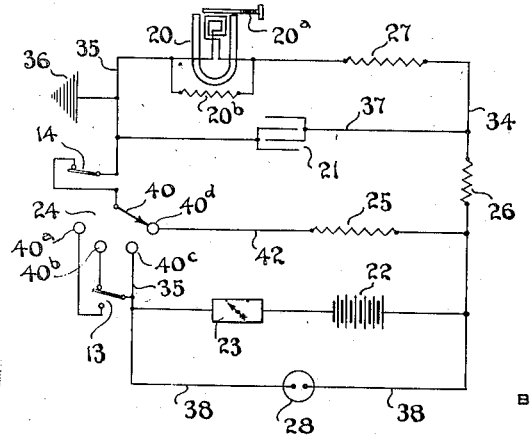
Figure 3 is a wiring diagram of the chronoscope.
Figure 3:
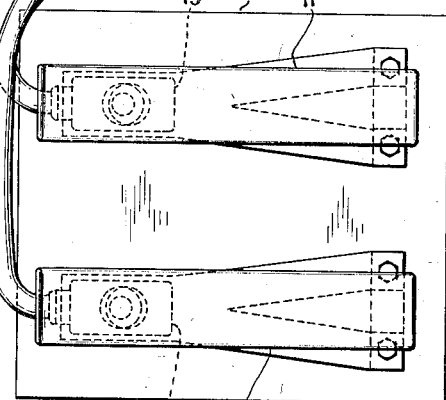

The wiring of the chronoscope is shown in Figure 3 wherein it will be seen that one side of the galvanometer 20 is connected to battery 22 through conductor 34 in which is mounted resistance coils 26 and 27. The other side of the galvanometer has connection with battery through conductor 35 in which is mounted switch 23, switch 13, selector switch 24, and switch 14. Conductor 35 is grounded on the cabinet 17 at 36. There is a circuit 37 including condenser 21 across lines 34, 35 in parallel with the galvanometer 20 and resistance coil 27. The lamp 28 is connected to the battery circuit by conductors 38 in such a manner as to be lighted thereby after the time-switch 23 is turned to "on" position. The selector switch 24 comprises movable arm 40, and four contacts 40a, 40b, 40c and 40d, respectively. Contact 40a is connected to the "make" contact of switch 13. Contact 40b is connected to the "break" contact of switch 13. Contact 40c and switch arm 40 are interposed in conductor 35. Contact 40d is connected to a shunt circuit 42 including resistance coil 25, whereby said circuit may be closed across lines 34, 35, through condenser 24 and galvanometer 20. The contact arm of switch 13 is connected to conductor 35. The contacts 40a, 40b, 40c and 40d are labeled "reaction", "movement", "total" and "reset" respectively, and these labels may appear on the outside of the cabinet beneath the switch knob 30.

The circuit is shown in Figure 3 as it appears in the inoperative position of the device. Switches 13, 14 are closed, time-switch 23 is open, and switch arm 40 of switch 24 is on "reset" contact 40d whereby battery is disconnected from galvanometer 20 and condenser 21, and any residual current in the latter is discharged.

In the operation of the device, assuming it is desired to measure the time required for subject to react to a mental stimulus, the knob 30 is turned so that it points to "reaction", whereby switch arm 40 engages contact 40a. The subject then depresses accelerator pedal 11 which closes line 35 from condenser 21 to battery 22 except for time-switch 23. The latter is then turned to the closed position. After a brief interval, say 8 seconds, switch 23 closes allowing battery current to flow to lamp 28 to substantially instantaneously light the latter, and also to flow through condenser 21 to charge the latter and to flow through galvanometer 20 to start to deflect the indicator 32 thereof. The high resistance 27 limits the current passing through galvanometer 20. As soon as light 28 flashes the subject removes his foot from pedal 11 as rapidly as his capabilities permit, whereby switch 13 opens line 35 and cuts off battery current to the condenser. The latter then discharges through galvanometer 20 and further deflects the indicator 32 of the latter, causing it to move across dial 31. The limit of its movement indicates the time in fractions of a second required for the subject to remove his foot from the pedal after the light flashed. The knob 30 is then turned to "reset" to permit the instrument indicator 32 to return rapidly to zero by fully discharging condenser 21 through resistance 25 before another test, and the time-switch 23 is turned to "off" position.

If it is desired to measure the time required for the subject to depress the brake pedal after removing his foot from the accelerator pedal, the knob 30 is turned to "movement" which puts switch arm 40 on contact 40b. The subject then proceeds as before by depressing accelerator pedal 11 and turning switch 23 to "on" position. In this case the operation of switch 13 by pedal 11 opens line 35 so that when switch 23 subsequently closes no battery flows to the condenser, although current does flow to lamp 28 to light the same. As soon as light 28 flashes, the subject removes his foot from pedal 11 and places it on pedal 12 to depress the latter and open switch 14. As soon as the subject lifts his foot from pedal 11 the switch 13 moves to close line 35 and battery current flows therethrough to condenser 21 and galvanometer 20 until said line again is opened by switch 14. Current in condenser 21 then discharges through galvanometer in the manner hereinbefore described so that a reading can be made. Thereafter switch 24 is moved to "reset" position and time switch 23 turned to "off" position.

If it is desired to measure the total time required for the subject to mentally react and to remove his foot from one pedal and depress the other pedal, after the signal is given, the knob 30 is turned to "total" and the test proceeded with in exactly the same manner as when measuring "movement". In this test, switch 24 normally closes line 35 because switch arm 40 is on contact 40c, and switch 13 is inoperative. Battery current flows to condenser 21 and galvanometer 20 as soon as time-switch 23 closes, and is disconnected therefrom as soon as switch 14 is opened by the depressing of pedal 12. Condenser 21 then discharges as hereinbefore described and the reading is made on the galvanometer dial 31.

The device when calibrated is extremely accurate because of the fact that time lag, due to inertia of the instruments, does not affect the results, as in the case where clocks or other mechanical devices are used. The device is relatively simple in construction and operation and achieves the several objects set out in the foregoing statement of objects.

Modification may be resorted to without departing from the spirit of the invention or the scope of the appended claims.

What is claimed is:

1. A chronoscope comprising a source of electrical energy, a condenser for storing electrical energy, a pair of conductors connecting said source of electrical energy to said condenser, a galvanometer connected in parallel with said condenser, a switch interposed in one of said conductors for making and breaking the circuit from the source of electrical energy to the condenser, a visual signal in parallel with said switch and source of electrical energy whereby the closing of said switch simultaneously operates said visual signal and starts the charging of said condenser from said source of electrical energy, and a pedal-operated switch interposed in one of the conductors from said source of electrical energy to said condenser, said switch being normally open and being closed by depression of the pedal, said galvanometer being calibrated in terms of time, whereby the interval of time of mental and physical reactions of a subject between the sighting of the visual signal and the opening of the pedal-operated switch, may be measured by the discharge of energy stored in said condenser during said interval, through said galvanometer when the pedal-operated switch is opened.

2. A chronoscope as defined in claim 1 in which the first-mentioned switch is provided with means for delaying the closing of the circuit between said source of electrical energy and said condenser and simultaneously the circuit between the source of electrical energy and the visual signal, until a predetermined time after said switch is thrown.

3. A chronoscope comprising a source of electrical energy, a condenser for storing electrical energy, a pair of conductors connecting said source of electrical energy to said condenser, a galvanometer connected in parallel with said condenser, a hand-operated switch interposed in one of said conductors for making and breaking the circuit from the source of electrical energy to the condenser, a visual signal in parallel with said switch and source of electrical energy whereby the closing of said switch simultaneously operates said visual signal and starts the charging of said condenser from said source of electrical energy, a pedal-operated switch interposed in one of the conductors from said source of electrical energy to said condenser, said pedal-operated switch being normally closed and being opened by depression of its pedal, said galvanometer being calibrated in terms of time, whereby the interval of time of mental and physical reactions of a subject elapsed between the sighting of the visual signal and the opening of the pedal-operated switch by the depression of its pedal may be measured by the discharge of energy stored in said condenser during said interval and discharged through said galvanometer when the pedal-operated switch is opened.

4. A chronoscope as defined in claim 3 in which the hand-operated switch is provided with means for delaying the closing of the circuit between said source of electrical energy and said condenser and simultaneously the circuit between the source of electrical energy and the visual signal, until a predetermined time after said switch is thrown.

5. A chronoscope comprising a source of electrical energy, a condenser for storing electrical energy, a circuit including a pair of conductors connecting said source of electrical energy to said condenser, a galvanometer connected in parallel with said condenser, a hand-operated switch interposed in one of said conductors for making and breaking the circuit from the source of electrical energy to the condenser, a visual signal connected in parallel with said switch and source of electrical energy whereby the closing of said switch operates said visual signal, a pair of pedal-operated switches of which one is connected to one of the conductors from said source of electrical energy to said condenser, and is a double-throw or two contact switch, closed on one contact when the pedal is raised and closed on the other contact when the pedal is depressed, the other of said switches being interposed in the aforesaid conductor and normally closed and being opened by depression of its pedal, and a selector switch interposed in the aforesaid conductor between said pedal-operated switches and adapted to be connected selectively, first, with the contact of the double-throw switch that is closed when the pedal thereof is depressed, secondly, with the contact of the double-throw switch that is closed when the pedal thereof is raised, and third, with the conductor in such a manner as to close the same and eliminate the double-throw switch therefrom, said galvanometer being calibrated in terms of time, whereby the intervals of time of mental and physical reactions of a subject between the appearance of the visual signal and the raising of the pedal of the double-throw switch, between the raising of the pedal of the double-throw switch and the depressing of the other pedal, and between the appearance of the visual signal and the depressing of the last-mentioned pedal may be selectively measured, by the positioning of the selector switch in the respective positions aforesaid, by the discharge of energy stored in said condenser, during said intervals, through said galvanometer.

6. A chronoscope as defined in claim 5 in which the hand-operated switch is provided with means for delaying the closing of the circuit between said source of electrical energy and said condenser and simultaneously the circuit between the source of electrical energy and the visual signal, until a predetermined time after said switch is thrown.

7. A chronoscope comprising a source of electrical energy, a condenser for storing electrical energy, a pair of conductors adapted to connect said source of electrical energy to said condenser, a galvanometer connected in parallel with said condenser, a hand-operated switch interposed in one of said conductors for making and breaking the circuit from the source of electrical energy to the condenser, a visual signal in parallel with said switch and source of electrical energy, said signal being visible when the source of electrical energy is operatively connected to the circuit through the closing of the said hand-operated switch, and a pair of pedal-operated switches interposed in one of the conductors between the source of electrical energy and the condenser, both of said pedal-operated switches being normally closed and each being opened by depression of its pedal, said galvanometer being calibrated in terms of time, whereby the interval of time of mental and physical reactions between the release of one pedal to close the circuit and the depression of the other pedal to open the circuit, by the subject upon sighting the visual signal, is measured by the energy stored in said condenser during said interval, which energy is discharged through said galvanometer, when the second pedal operated switch is opened.

8. A chronoscope as defined in claim 7 in which the hand-operated switch is provided with means for delaying the operative connection of the source of electrical energy with the circuit, and the closing of the circuit between the source of electrical energy and the visual signal, until a determinate time after said switch is thrown.

ROY W. BROWN.